(12) United States Patent
Rajagopal

(10) Patent No.: US 11,882,482 B2
(45) Date of Patent: Jan. 23, 2024

(54) METHOD AND APPARATUS FOR BALANCING SERVER LOAD IN CLOUD RAN SYSTEMS

(71) Applicant: MAVENIR NETWORKS, INC., Richardson, TX (US)

(72) Inventor: Sridhar Rajagopal, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 176 days.

(21) Appl. No.: 17/406,274

(22) Filed: Aug. 19, 2021

(65) Prior Publication Data
US 2022/0070734 A1    Mar. 3, 2022

Related U.S. Application Data

(60) Provisional application No. 63/072,385, filed on Aug. 31, 2020.

(51) Int. Cl.
*H04W 28/08* (2023.01)
*G06F 9/455* (2018.01)

(52) U.S. Cl.
CPC .... *H04W 28/0975* (2020.05); *G06F 9/45558* (2013.01); *H04W 28/0838* (2020.05);
(Continued)

(58) Field of Classification Search
CPC ......... H04W 28/0975; H04W 28/0838; H04W 28/0858; H04W 28/0867; H04W 28/08;
(Continued)

(56) References Cited

U.S. PATENT DOCUMENTS

2017/0310437 A1*  10/2017  Bottari ................. H04W 16/10
2018/0287696 A1*  10/2018  Barbieri ............... H04W 36/08
(Continued)

FOREIGN PATENT DOCUMENTS

| CN | 106879022 A | 6/2017 | |
| CN | 106095529 B | 7/2019 | |
| WO | WO-2014070059 A1 * | 5/2014 | ............. H04B 7/216 |

OTHER PUBLICATIONS

Checko et al. Cloud RAN for Mobile Networks—A Technology Overview, IEEE Communication Surveys and Tutorials, 17(1), 405-426, 2015 (Year: 2015).*
(Continued)

*Primary Examiner* — Ayaz R Sheikh
*Assistant Examiner* — David Zhijun Sun
(74) *Attorney, Agent, or Firm* — Ruggiero, McAllister & McMahon LLC

(57) ABSTRACT

A method of handling communication traffic from one or more User Equipment (UE) in a Cloud Radio Access Network (CRAN) network includes: analyzing, by an analytics engine in the CRAN network, communication traffic distribution and loads across multiple cell sites; and determining, by the analytics engine, an optimal mapping of one of a specified cell site or a selected sector of a specified cell site to one of a specified virtual machine or server. Communication traffic from a sector of a first cell site having a first type of traffic load profile and communication traffic from a sector of a second specified cell site having a second type of traffic load profile are aggregated by a single specified virtual machine or server.

9 Claims, 8 Drawing Sheets

(52) U.S. Cl.
CPC ... *H04W 28/0858* (2020.05); *H04W 28/0867* (2020.05); *G06F 2009/45591* (2013.01); *G06F 2009/45595* (2013.01)

(58) Field of Classification Search
CPC .......... H04W 28/0942; H04W 28/0958; G06F 9/45558; G06F 2009/45591; G06F 2009/45595; H04L 47/41; H04L 47/125
See application file for complete search history.

(56) References Cited

U.S. PATENT DOCUMENTS

2021/0184795 A1\* 6/2021 Ibars Casas .......... H04L 1/0061
2021/0204148 A1\* 7/2021 Chou .................... H04W 24/02

OTHER PUBLICATIONS

Extended European Search Report for corresponding European application EP21192618.3, 15 pages, dated Jan. 24, 2022.

\* cited by examiner

METHOD AND APPARATUS FOR BALANCING SERVER LOAD IN CLOUD RAN SYSTEMS

CROSS-REFERENCE TO RELATED APPLICATIONS

The present application claims the benefit of U.S. Provisional Patent Application No. 63/072,385, filed on Aug. 31, 2020, which is incorporated by reference herein in its entirety.

BACKGROUND OF THE DISCLOSURE

1. Field of the Disclosure

The present disclosure relates to systems and methods for Radio Access Networks (RANs), and relates more particularly to Cloud-based RANs (CRANs) for $4^{th}$-Generation (4G) and $5^{th}$-Generation (5G) based mobile networks.

2. Description of the Related Art

To reduce hardware server core requirements at data center, it is important to balance load within server/virtual machine (VM) and across servers/VMs. To balance load within server/VM, it is important to have a task pooling scheme where tasks are well-defined and the application running on the server/VM is broken to small tasks which can be scheduled across the cores to balance the core utilization in the server/VM. However, balancing load across servers/VMs is not well understood for CRAN deployments, mainly because running RAN applications in a data center is a new area for the telecommunication industry. There has not been a significant development on how to map cell site traffic to a rack of servers and optimizing the computational operations across these servers to maximize the number of sites supported and/or make the most efficient use of the available hardware. In addition, there are considerations such as redundancy and high availability that need to be considered if there is a hardware or radio issue which increases the demand on resources.

Therefore, there is a need for a solution to efficiently mapping cell site traffic to a plurality of servers and optimizing the computational operations across these servers. The present disclosure provides an approach to balance the load across servers/VMs using the traffic/load pattern history for the different sites that is available at the data center.

SUMMARY OF THE DISCLOSURE

In one example embodiment, the present disclosure provides CRAN-based method and system in which traffic from multiple cell sites with different traffic profiles are pooled together in a single data center.

In one example embodiment, the present disclosure provides CRAN-based method and system for balancing system load across servers and/or virtual machines (VMs) in a cloud RAN deployment where traffic from cell sites with different traffic profiles are mixed together in a single virtual machine or server in order to provide pooling gains.

In one example embodiment, the present disclosure provides CRAN-based method and system in which sectors from cell site are distributed to different servers or virtual machines for pooling gains while component carriers (frequency blocks) within a sector are mapped to the same server or virtual machine, e.g., in order to provide tight synchronization for carrier aggregation technique and scheduling.

In one example embodiment, the present disclosure provides CRAN-based method and system in which a single server or virtual machine aggregates traffic from sectors of different cell sites having different traffic profiles.

In one example embodiment, the present disclosure provides a CRAN-based method in which an analytics engine is used to i) predict load across multiple cell sites during different time durations/periods and ii) derive an optimal mapping of cell sites and sectors to servers/VMs to balance resource utilization.

In one example embodiment, the present disclosure provides a CRAN-based method in which some servers handle traffic from multiple cell sites with different profiles while other servers are dedicated to handling some specific cell sites to provide specific service level agreements (SLAs) services, e.g., low latency or guaranteed throughput.

DETAILED DESCRIPTION

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing. In contrast, in Cloud-based Radio Access Networks (CRANs), a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

Figure 1:
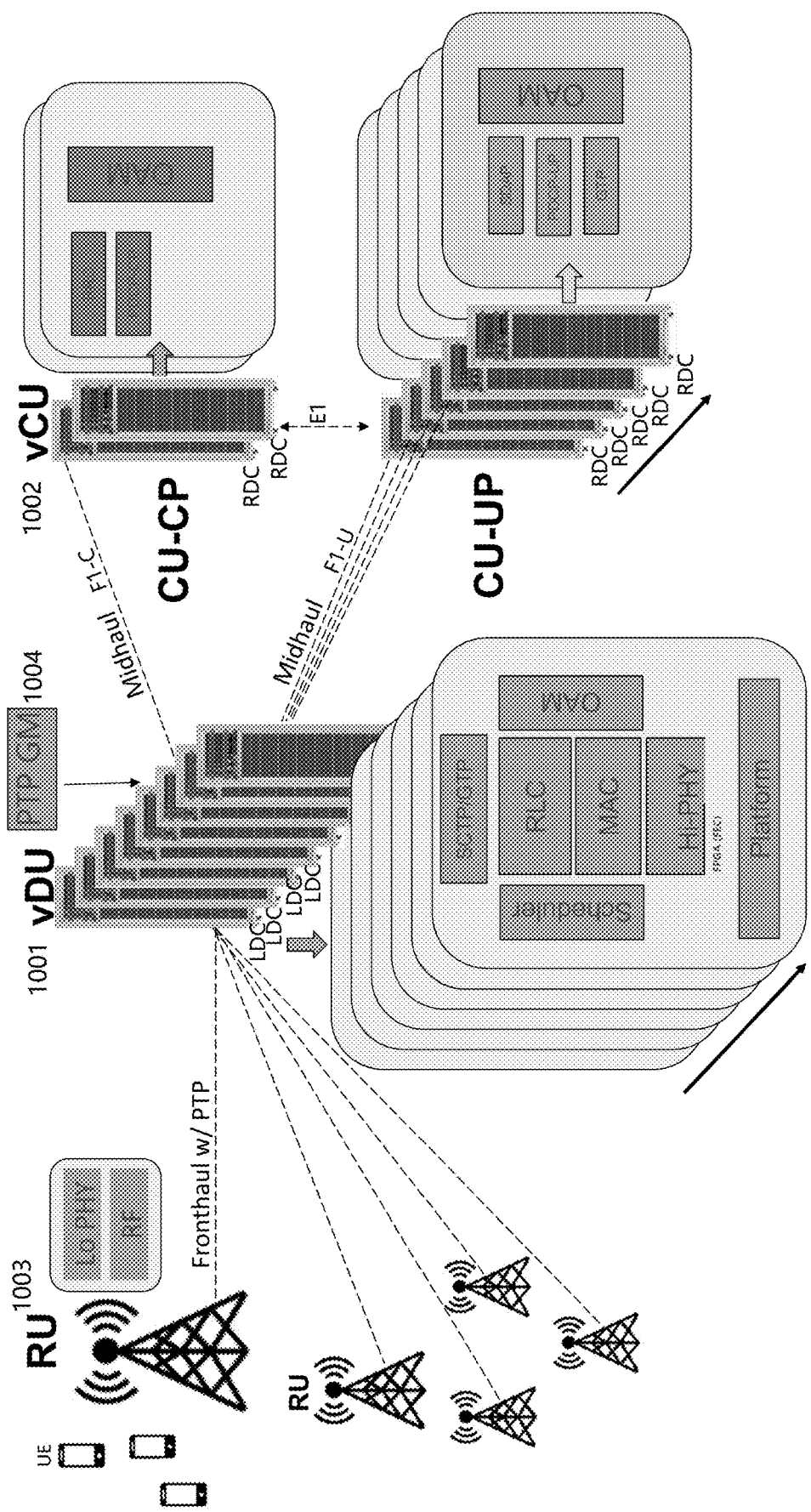
FIG. 1 illustrate a representative cloud RAN implementation in which the RAN processing is performed at a data center.

FIG. 1 illustrate a representative cloud RAN implementation/solution where the RAN processing is performed at a data center. As shown in FIG. 1, the RAN processing is split into a distributed unit (DU) and a centralized unit (CU), where either or both of them may be running in a virtualized environment (e.g., vDU 1001, vCU 1002) on the data center. As shown in FIG. 1, the low physical layer (Lo PHY) functions and RF functions are performed at the RU. The interface between the CU and DU is called the midhaul. The interface between the radios (RU) 1003 and the DU is called the fronthaul. 3rd Generation Partnership Project (3GPP) has defined 8 options for the split between the DU and the RU among different layers of the protocol stack. One standardized split option is 7-2x (Intra-Physical (PHY) layer split). Furthermore, both the CU and DU may be implemented in the same data center or in different data centers in a cloud RAN implementation. FIG. 1 illustrates example embodiment of the functional blocks (modules) running at the CU and DU. Some of the functions handled at the DU (shown as vDU in FIG. 1) include: high physical layer (Hi-PHY) functions, MAC, RLC, OAM, Scheduler, and SCTP/GTP (for the definitions of acronyms, see the "Glossary of Terms" at the end of the specification). Also shown in FIG. 1 is PTP GM 1004, which sends timing packets to the network elements, e.g., vDU 1001 shown in FIG. 1. Furthermore, the CU may be further split into a control plane (CU-CP) and a user plane (CU-UP) for further disaggregation and to allow independent scaling of the functionality. Some of the functions handled at the CU-CP include: RRC, PDCP-CP, and OAM, as shown in FIG. 1. Some of the functions handled at the CU-UP include: SDAP, PDCP-UP, GTP, and OAM. Although the present disclosure is applicable to different variations of the data center implementations, e.g., bare-metal (server), virtual machine (VM), and container-based implementations at the data center deployments, the present disclosure will refer to a server or VM for the sake of simplicity.

Figure 2:
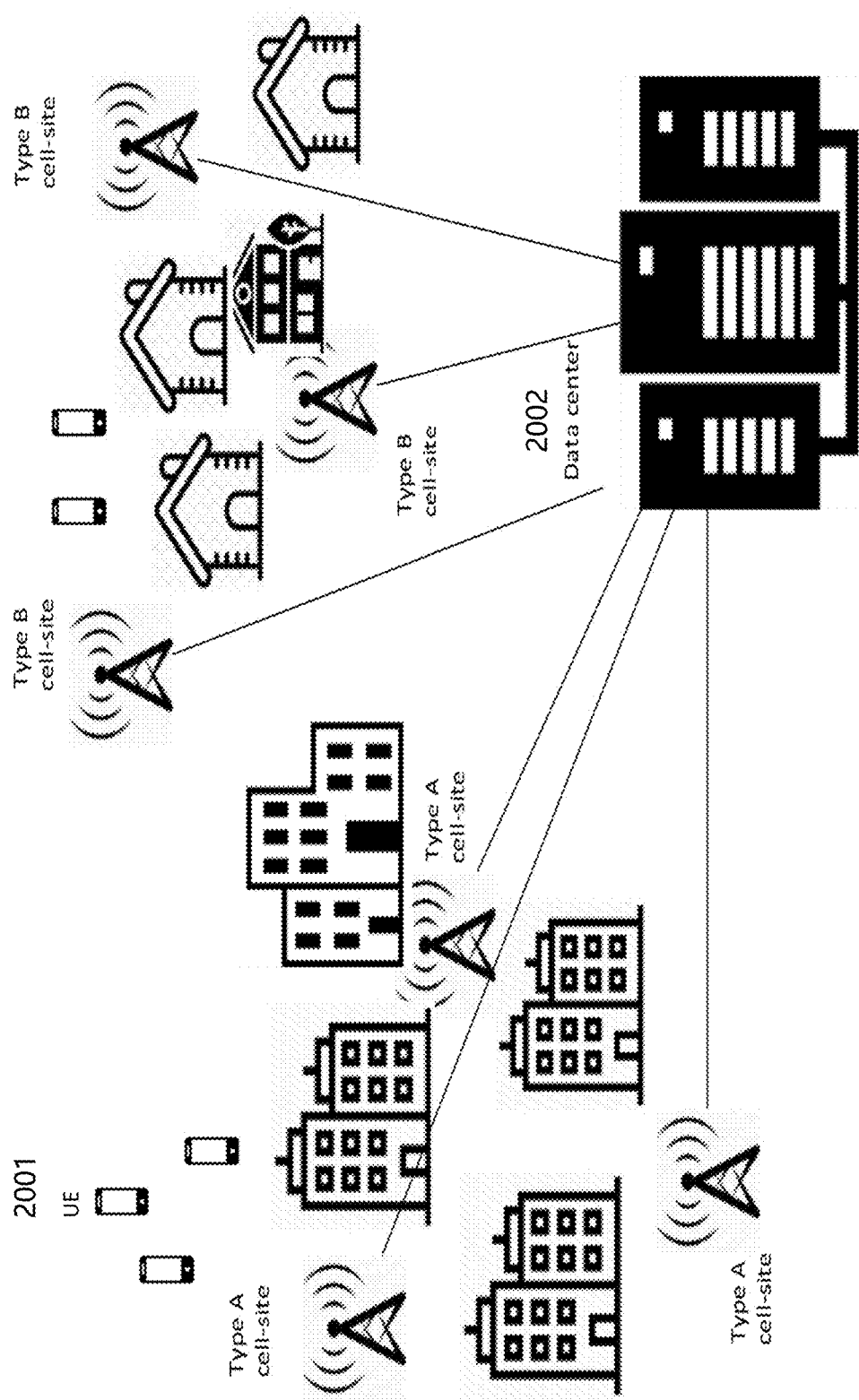
FIG. 2 illustrates two types of cell sites that are assumed to be present that can connect to a data center.

For purposes of the present disclosure, it is assumed that the cell sites connected to the data center 2002 (e.g., as shown in FIG. 2) will have different traffic (e.g., involving UE 2001 communication) distributions. As an example, FIG. 2 illustrates two types of cell sites that are assumed to be present: Type A and Type B. Type A can be, e.g., a cell site at an industrial location showing more traffic during work hours, and Type B can be, e.g., a cell site at a residential location showing more traffic during off work hours.

Figure 3:
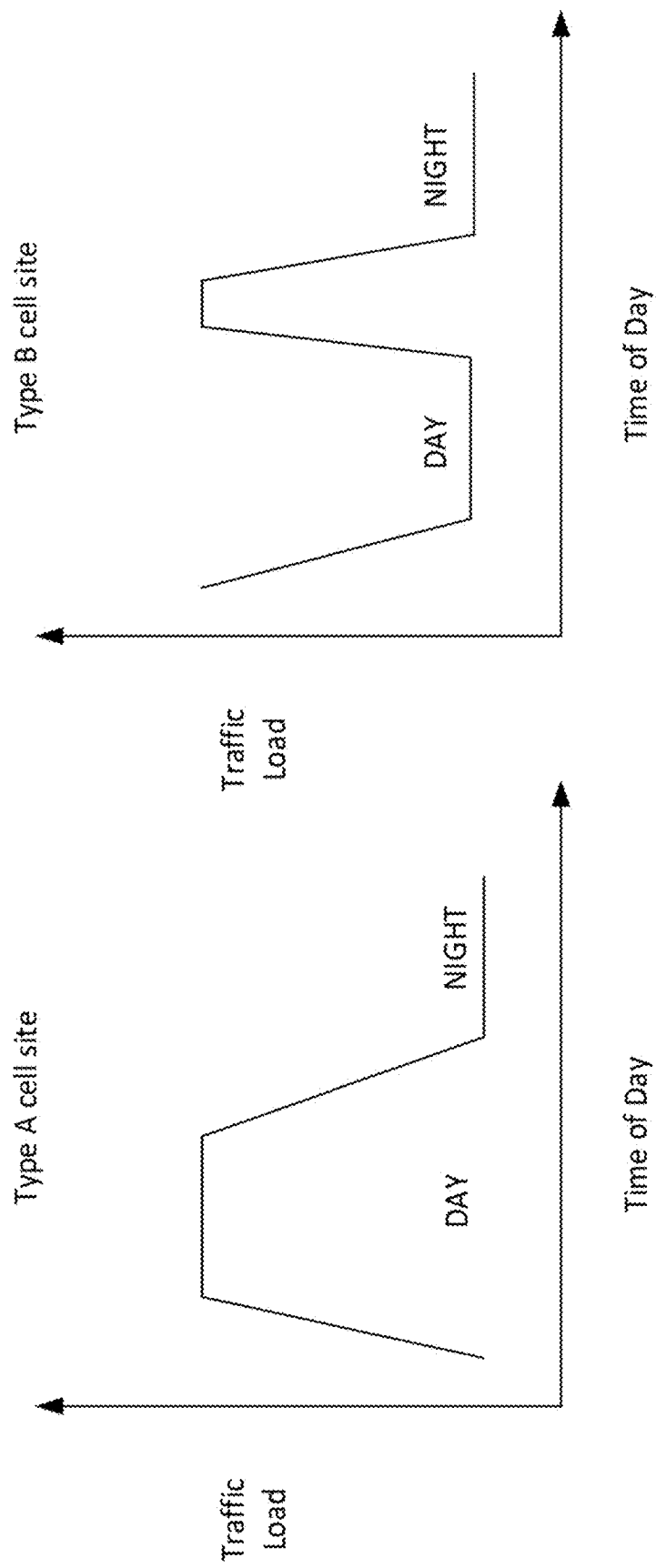
FIG. 3 shows graphs illustrating example traffic profiles for two types of cell sites.

FIG. 3 shows graphs illustrating example traffic profiles for Type A and Type B cell sites. Type A cell has a heavy load during work hours (e.g., "day" time period), while Type B cell site has a heavy load during off-peak hours (e.g., early morning and early evening time periods). In addition, there can be durations, e.g., at late night, when both Type A and Type B cell sites are both relatively idle.

Figure 4:
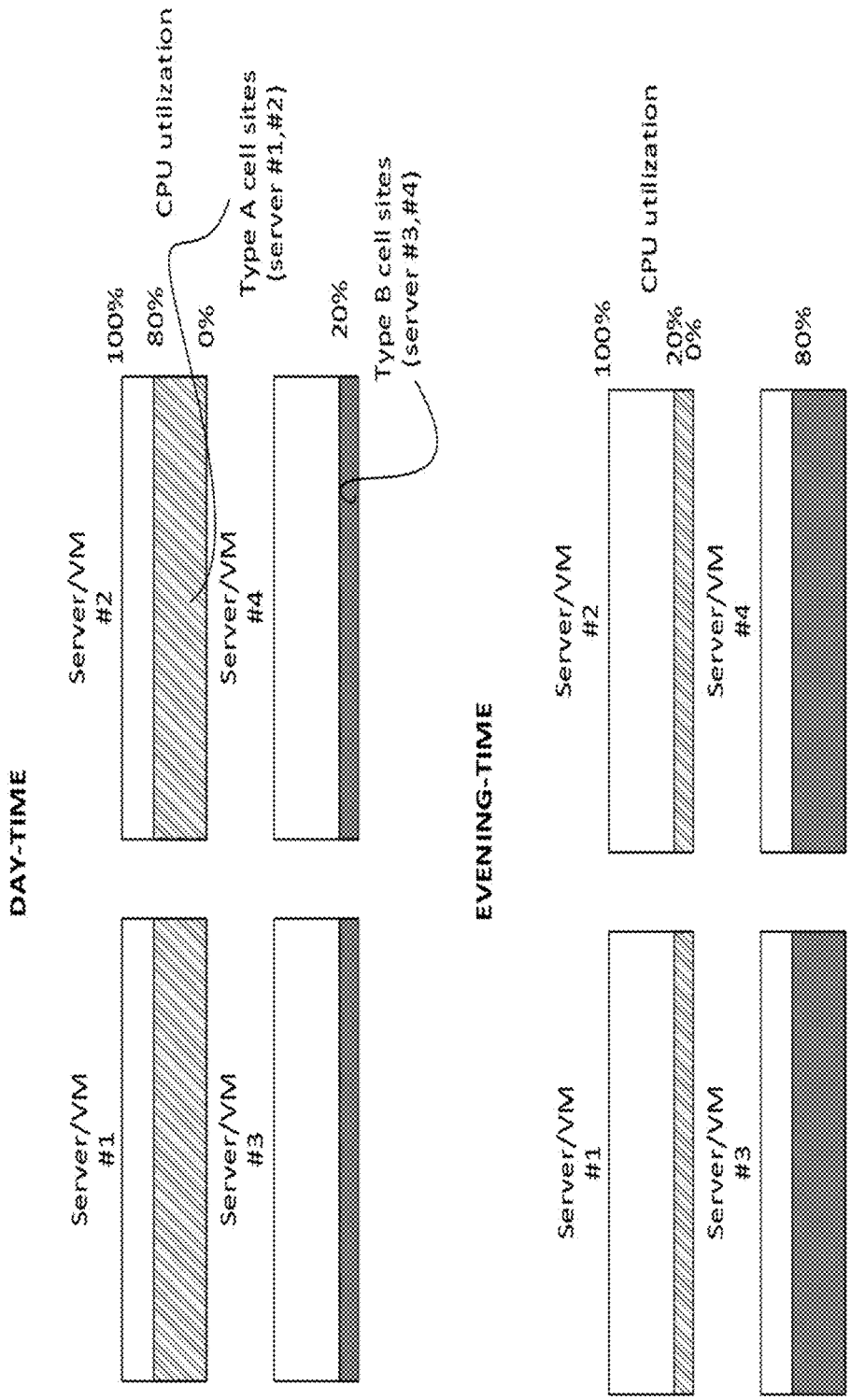
FIG. 4 shows illustrations of example mappings of cell sites to the servers/VMs in a data center.

FIG. 4 shows illustrations of example mappings of cell sites to the servers/VMs in a data center where cell sites with similar traffic profile are mapped to the same server. In this case, a 4-server/VM example is shown, where server/VM #1 and server/VM #2 host Type A cell sites, while server/VM #3 and server/VM #4 host type B cell sites. A single VM per server is just used as an example and not a requirement for this invention. A server may have multiple VMs (or in the case of Kubernetes, multiple PODS running on the server). During day time, servers/VMs #1 and #2 providing service to type A cell sites show a higher load (e.g., 80% in this example), while servers/VMs #3 and #4 providing service to type B cell sites show a relatively lower load (e.g., 20% in this example). In the evening time, the situation is reversed, where the servers/VMs #3 and #4 serving the type B cell sites show a higher load (e.g., 80% in this example), while the servers/VMs #1 and #2 serving the type A cell sites show a lower load (e.g., 20% in this example). It should be noted that within a given server/VM, the RAN applications may still be running intelligently to balance the load across the cores in the given server, but the load across the servers is never fully balanced in this example.

Figure 5:
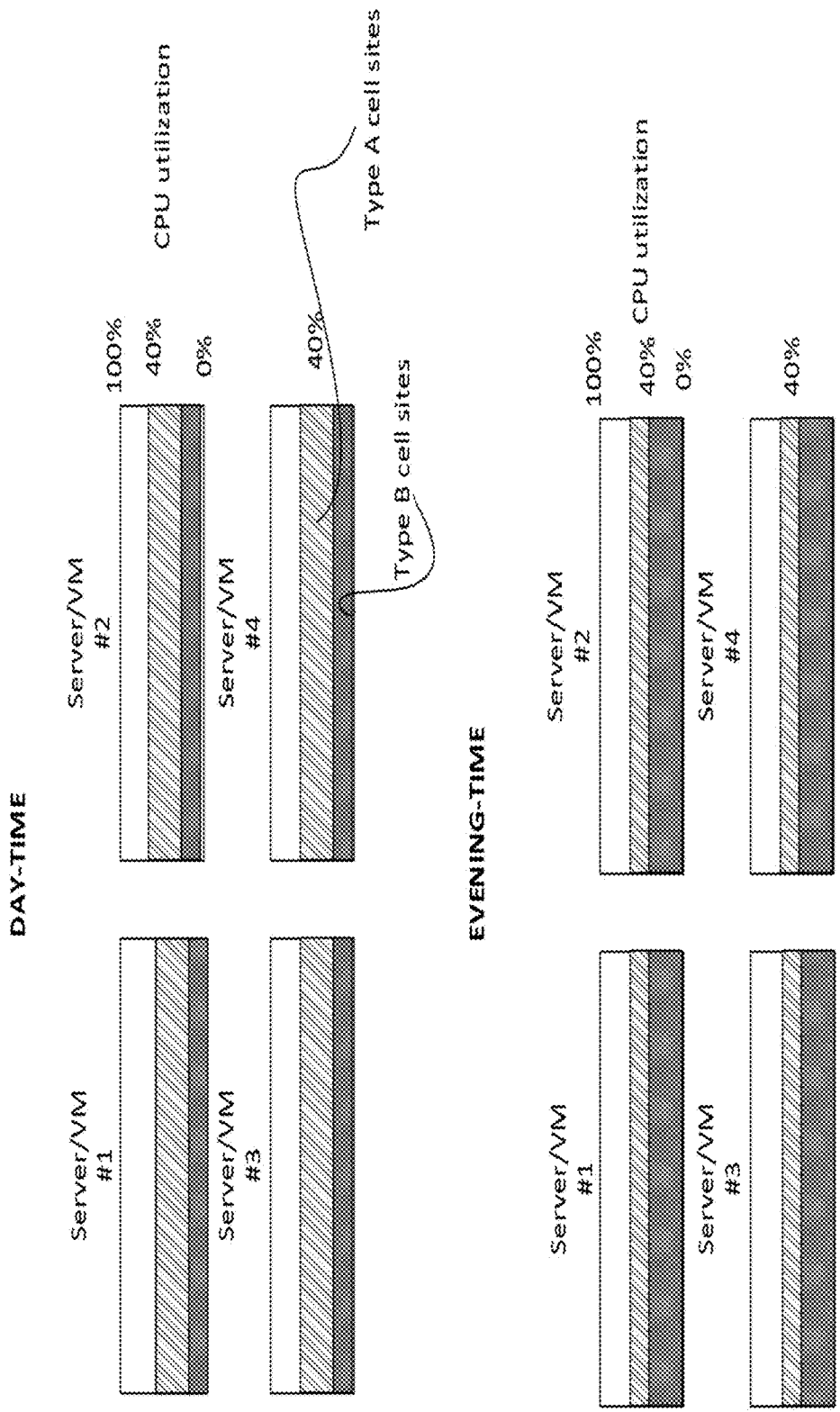
FIG. 5 illustrate an example embodiment of the present disclosure in which each server processes mixed traffic from multiple types of cell sites.

In an example embodiment of the present disclosure illustrated in FIG. 5, the load is balanced more uniformly across various servers when the traffic from cell sites of multiple different profiles are mixed together inside the same server or VM. In this example embodiment, each server processes mixed traffic from multiple types of cell sites (e.g., sector 1 from a Type A cell-site and sector 1 from a Type B cell-site go to the same server/VM). As can be seen from FIG. 5, the load is uniformly distributed in the example scenario, where the higher-load and lower-load cell sites are mixed together inside the same server or VM. During the day time, Type A cell-sites provide a higher relative load, while in the evening, Type B cell-sites provide a higher relative load, and overall, the utilization of the servers gets averaged approximately the same across all servers. The mapping can be changed semi-statically during idle time or can be changed during a maintenance window for reconfiguration, if needed.

The example embodiment illustrated in FIG. 5 leads to improved load balancing across servers, and hence, this example embodiment can be dimensioned to a server with lower cost hardware for supporting same number of cell sites and/or serve additional cell sites with same hardware, leading to cost improvements for deployment. It should be noted that if a sector of cell sites supports multiple carriers and plans to support features that require tight synchronization and scheduling across carriers such as carrier aggregation (CA), those cell sites could be mapped to the same server/VM to improve timing for the application. The spare capacity in the server could also be used to run non-real time workloads during off peak hours, if needed.

Figure 6:
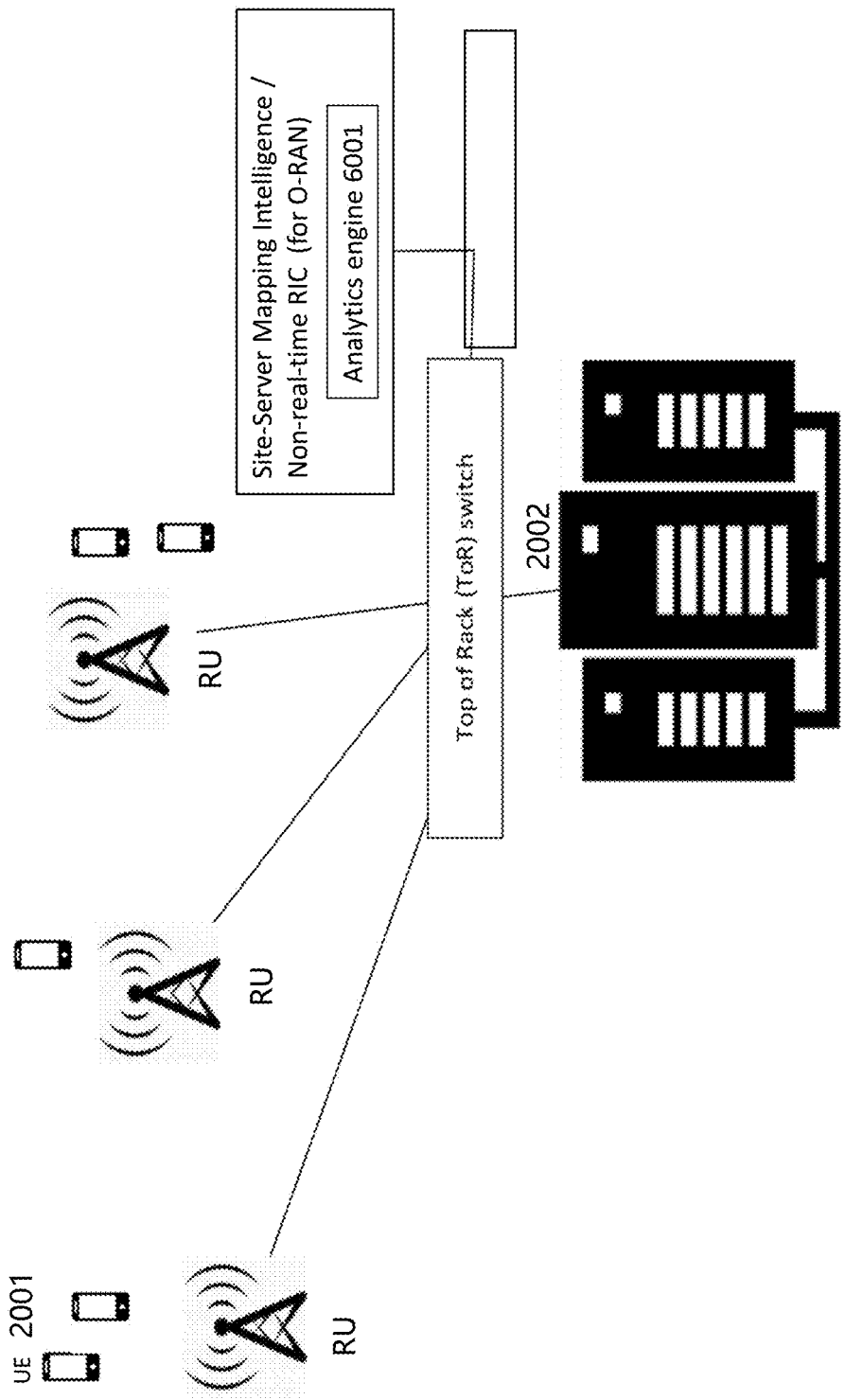
FIG. 6 illustrates an analytical module for mapping the cell sites to the servers.

In one example embodiment of the present disclosure illustrated in FIG. 6, an analytical module (e.g., an analytics engine implemented in software and/or hardware) for mapping the cell sites to the servers is built as part of network intelligence nodes in the network. In this example embodiment, the analytics engine in the network is configured to i) analyze traffic distribution and loads across cell sites during different time durations in the day and ii) determine which cell sites can be best pooled together for optimal efficiency in terms of resource utilization. In FIG. 6, the analytics engine 6001 is shown as part of the "site-server mapping intelligence" block. In Open RAN (O-RAN) based deployments, the analytics engine 6001 can be incorporated as part of a non-real time radio intelligence controller (non-real-time RIC), for example. The analytics engine could also be scheduled as non-real-time workload(s) in the server(s) during off-peak hours when the resource utilization is low. FIG. 6 additionally shows the data center 2002, to which the analytics engine 6001 is operatively coupled to dynamically provide the mapping between the cell sites and the servers using the Top of Rack (ToR) switch.

Figure 7:
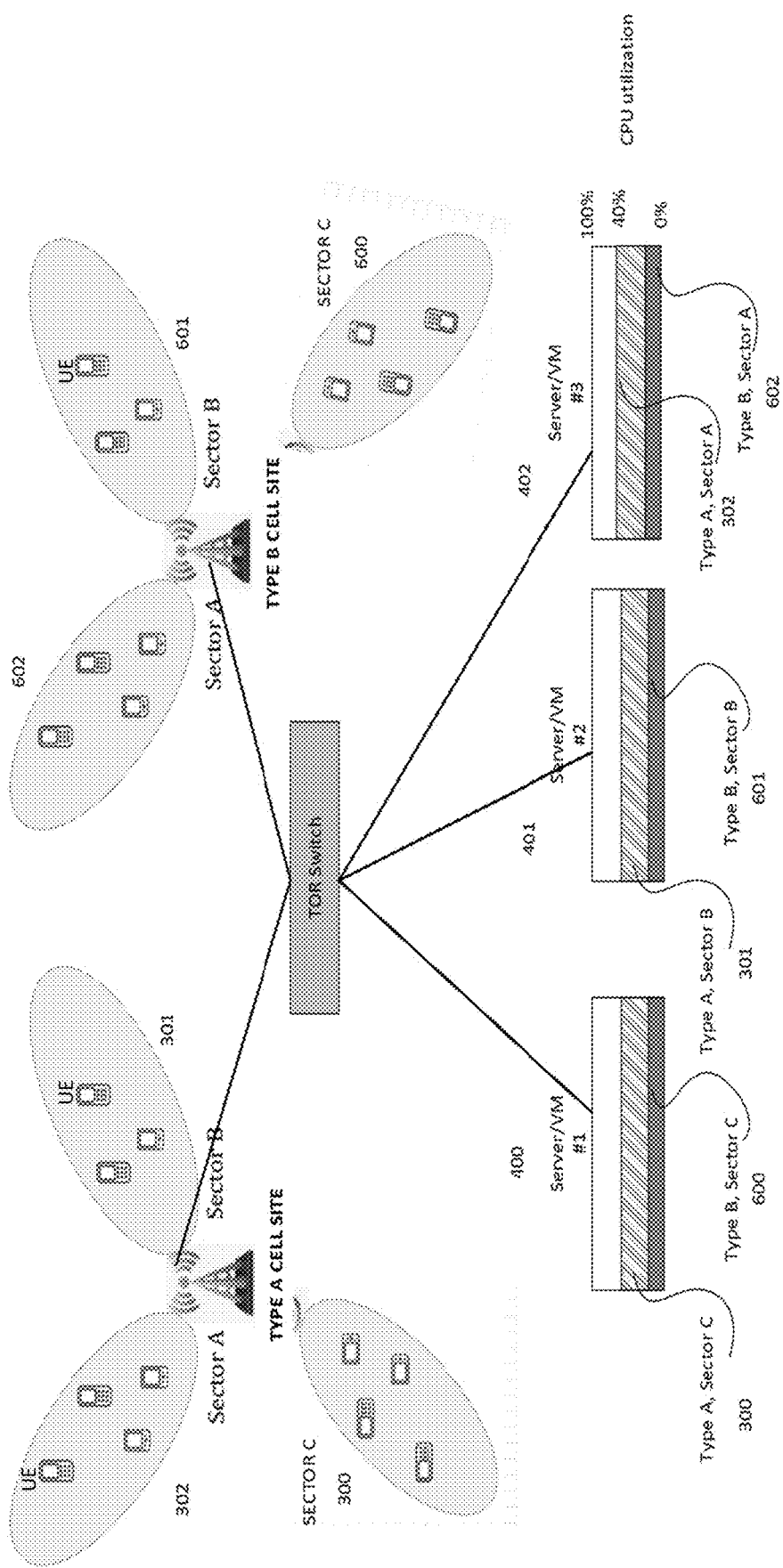
FIG. 7 illustrates an example embodiment of a method and a system for mapping sectors in a site to servers to balance the load across servers.

FIG. 7 shows an example embodiment of a method and a system for mapping sectors in a site to servers to balance the load across servers. In this illustration of the example embodiment, mapping of DUs to specific cell sites is shown. The network mapping intelligence (analytics engine) analyzes traffic distribution and loads and determines a mapping of DUs (containing server(s)/VM(s)) to cell IDs (in this example, each cell is a different sector, e.g., sector C 300, sector B 301, or sector A 302 of a Type A cell site, or sector C 600, sector B 601, or sector A 602 of Type B cell site, as shown in FIG. 6). In this example, as summarized in Table 1 below and schematically shown in FIG. 7, DU server/VM #1 400 supports cell (sector) C 300 of Type A cell site and cell (sector) C 600 of Type B cell site for pooling gains to load-balance. If there are multiple cells within a sector, those cells may be mapped to the same server or VM so that features such as carrier aggregation requiring tight synchronization and scheduling can be performed by the hardware efficiently. For example, if there was another cell 303 (not shown in FIG. 7) in the same sector as cell 300, cell 303 would be mapped to same DU ID 400 if a feature such as carrier aggregation would need to be supported across cells 303 and 300. In addition, as shown in FIG. 7 and summarized in Table 1, DU server/VM #2 401 supports cell (sector) B 301 of Type A cell site and cell (sector) B 601 of Type B cell site; and DU server/VM #3 402 supports cell (sector) A 302 of Type A cell site and cell (sector) A 602 of Type B cell site.

TABLE 1

| DU ID | cell ID |
|-------|---------|
| 400   | 300     |
| 400   | 600     |
| 401   | 301     |
| 401   | 601     |
| 402   | 302     |
| 402   | 602     |

Figure 8:
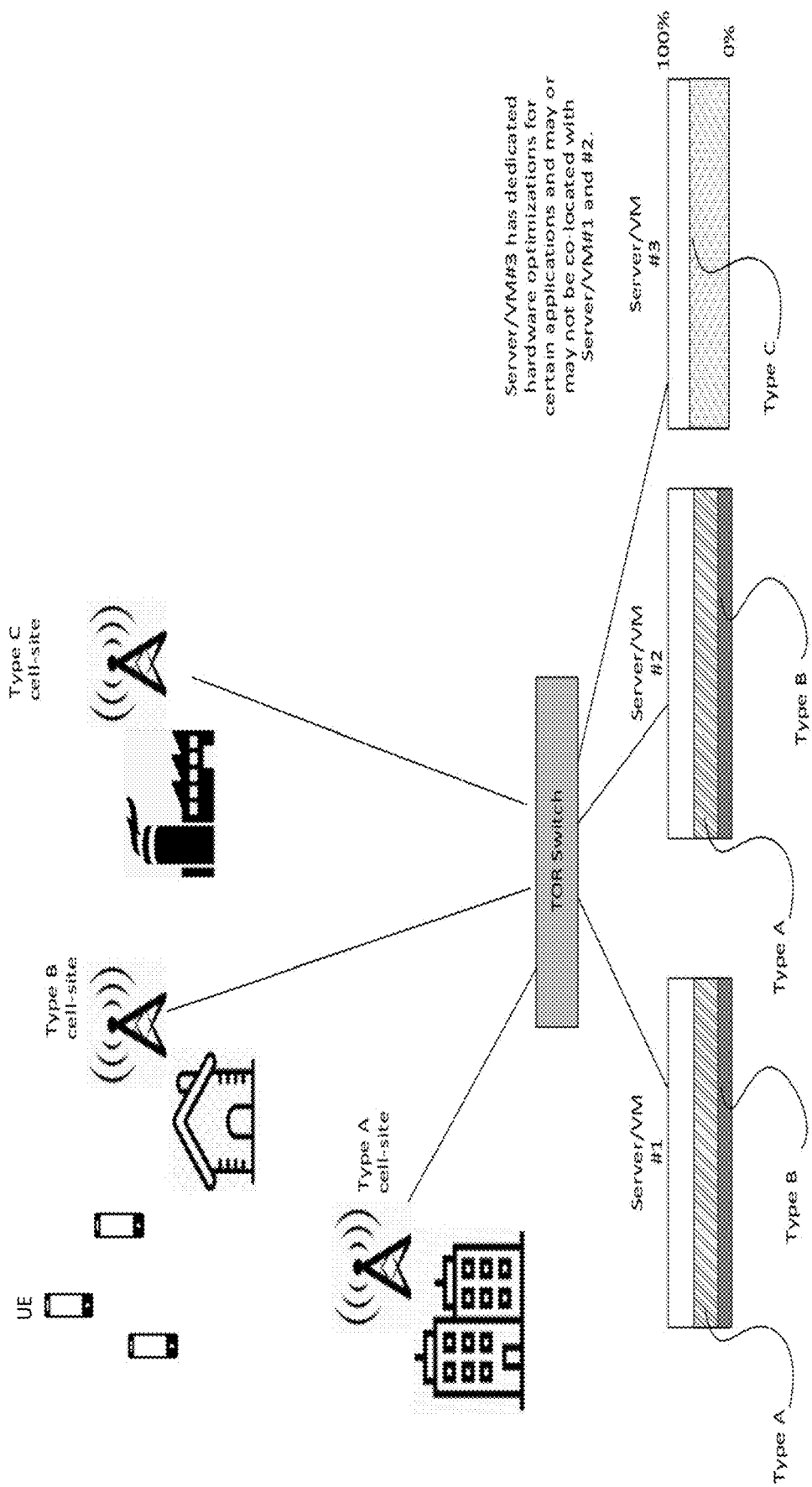
FIG. 8 illustrates an example embodiment of a method and a system in which a type of cell site involved in handling traffic with SLA guarantees is mapped to a specific server.

In another example embodiment of the present disclosure illustrated in FIG. 8, certain cell sites, e.g., Type C cell sites, are optimized for certain traffic with service level agreement (SLA) guarantees (e.g., cell sites serving some private networks or industrial internet of things (IoT)). In addition, FIG. 8 shows Type A cell site (e.g., business/commercial location) and Type B cell site (e.g., residential). In such situations involving SLA guarantees, the customers may be willing to pay a premium for SLA guarantees and there can be dedicated hardware to provide such SLAs (depending on the SLA requirements). In the example embodiment shown in FIG. 8, Type C cell sites involved in handling traffic with SLA guarantees can be mapped to specific server(s) (e.g., Server/VM #3 in this case), which can (but not required to) i) have some specific dedicated processing and/or low latency hardware support, and ii) be co-located with the other servers for load balancing. FIG. 8 additionally shows Server/VM #1 and Server/VM #2, each of which handles a mixture of traffic from Type A and Type B cell sites.

As a summary, several examples of the method according to the present disclosure are provided.

A first example of the method according to the present disclosure provides a method of handling communication traffic in a Cloud Radio Access Network (CRAN)—compatible system, comprising: directing communication traffic from a first specified cell site having a first type of traffic load profile to one of a specified virtual machine or server; directing communication traffic from a second specified cell site having a second type of traffic load profile to the one of the specified virtual machine or server; and aggregating, by the one of the specified virtual machine or server, the communication traffic from the first specified cell site and the second specified cell site.

In a second example of the method modifying the first example of the method, the first specified cell site is a first type of cell site; the second specified cell site is a second type of cell site; and the one of the specified virtual machine or server is part of a specified data center.

In a third example of the method modifying the second example of the method, the aggregating of the communication traffic from the first and second types of cell sites at the one of the specified virtual machine or the server provides pooling gains.

In a fourth example of the method modifying the first example of the method, a specified sector of the first specified cell site and a specified sector of the second specified cell site are aggregated by the one of the specified virtual machine or server.

In a fifth example of the method modifying the first example of the method, the communication traffic from the first and second types of cell sites originate from one or more user equipment (UE) in the CRAN-compatible system.

In a sixth example of the method modifying the second example of the method, i) the first type of cell site is an industrial location and ii) the second type of cell site is a residential cell site.

A seventh example of the method according to the present disclosure provides a method of handling communication traffic in a Cloud Radio Access Network (CRAN)—compatible system, comprising: directing communication traffic from a first sector of a specified cell site to one of a first specified virtual machine or server; directing communication traffic from a second sector of the specified cell site to one of a second specified virtual machine or server; mapping component carriers within the first sector to the one of the first specified virtual machine or server; and mapping component carriers within the second sector to the one of the second specified virtual machine or server.

An eighth example of the method according to the present disclosure provides a method of handling communication traffic in a Cloud Radio Access Network (CRAN) network, comprising: analyzing, by an analytics engine in the CRAN network, communication traffic distribution and loads across multiple cell sites; and at least one of: i) determining, by the analytics engine, an optimal mapping of one of a specified cell site or a selected sector of a specified cell site to one of a specified virtual machine or server during different times of the day; and ii) using available spare capacity in the one of the specified virtual machine or server for non-real-time workloads in the server during low-load conditions.

In a ninth example of the method modifying the eighth example of the method, at least one first specified virtual machine or server handles communication traffic from multiple cell sites with different traffic load profiles; and at least one second specified virtual machine or server handles communication traffic from at least one cell site to provide services pursuant to specified service level agreement (SLA) stipulating at least one of low latency and high throughput.

In a tenth example of the method modifying the eighth example of the method, the CRAN network is an Open RAN (O-RAN) based network, and the analytics engine is incorporated as part of a non-real time radio intelligence controller (non-real-time MC).

In an eleventh example of the method modifying the first example of the method, the method further comprises: evaluating, by an analytics engine, the traffic load profile at the first specified cell site and the traffic load profile at the second specified cell site.

Glossary of Terms

3GPP: Third generation partnership project
CA: Carrier Aggregation

CU-CP: Centralized Unit-Control Plane
C-RAN: cloud radio access network
CU-UP: Central unit-User Plane
DU: Distributed unit
FH: Fronthaul
GTP: General Packet Radio Service Tunneling Protocol
LDC: Local Data Center
LTE: long term evolution
MAC: medium access control
OAM: Operation and management
O-RAN: Open Radio Access Network
PDCP: Packet Data Convergence Protocol
    PDCP-CP: Packet Data Convergence Protocol-Control Plane
    PDCP-UP: Packet Data Convergence Protocol-User Plane
PH physical layer
    Lo-PHY: lower physical layer
    Hi-PHY: high physical layer
PTP GM: Precision Timing Protocol Grand Master
RAN: Radio Access Network
RDC: Remote Data Center
RIC: Radio Intelligent Controller
RF: radio frequency interface
RLC: Radio Link Control
RRC: Radio Resource Control
RRU: Remote radio unit
RU: Radio Unit
SCTP: Stream Control Transmission Protocol
SDAP: Service Data Adaptation ProtocolSIMO: single input, multiple output
vBBU: Virtualized baseband unit
vCU: Virtualized Centralized Unit
vDU: Virtualized Distributed Unit
VM: Virtual Machine

What is claimed is:

1. A method of handling communication traffic in a Cloud Radio Access Network (CRAN)—compatible system, comprising:
   i) directing, by a Top of Rack switch, communication traffic from a first sector of a first specified cell site having a first type of traffic load profile to one of a first specified virtual machine or server;
   ii) directing, by the Top of Rack switch, communication traffic from a first sector of a second specified cell site having a second type of traffic load profile to the one of the first specified virtual machine or server; and
   iii) directing, by the Top of Rack switch, communication traffic from a second sector of the first specified cell site to one of a second specified virtual machine or server;
   iv) directing, by the Top of Rack switch, communication traffic from a second sector of the second specified cell site to the one of the second specified virtual machine or server;
   v) aggregating, by the one of the first specified virtual machine or server, the communication traffic from the first sector of the first specified cell site with the communication traffic from the first sector of the second specified cell site; and
   vi) aggregating, by the one of the second specified virtual machine or server, the communication traffic from the second sector of the first specified cell site with the communication traffic from the second sector of the second specified cell site.

2. The method of claim 1, wherein:
the first specified cell site is a first type of cell site;
the second specified cell site is a second type of cell site; and
the one of the first specified virtual machine or server is part of a specified data center; and
the one of the second specified virtual machine or server is part of the specified data center.

3. The method of claim 1, wherein:
the communication traffic from the first specified cell site and the second specified cell site originate from one or more user equipment (UE) in the CRAN-compatible system.

4. The method of claim 2, wherein i) the first type of cell site is an industrial location and ii) the second type of cell site is a residential cell site.

5. The method of claim 1, further comprising:
mapping component carriers within the first sector of the first specified cell site to the one of the first specified virtual machine or server;
mapping component carriers within the second sector of the first specified cell site to the one of the second specified virtual machine or server;
mapping component carriers within the first sector of the second specified cell site to the one of the first specified virtual machine or server; and
mapping component carriers within the second sector of the second specified cell site to the one of the second specified virtual machine or server.

6. The method of claim 1, further comprising:
analyzing, by an analytics engine in a Cloud Radio Access Network (CRAN) network, communication traffic distribution and loads across multiple cell sites; and
at least one of:
i) determining, by the analytics engine, an optimal mapping of one of a specified cell site or a selected sector of a specified cell site to one of a specified virtual machine or server during different times of the day; and
ii) using available spare capacity is changed to in the one of the specified virtual machine or server for non-real-time workloads during low-load conditions.

7. The method according to claim 6, wherein:
the one of the first specified virtual machine or server and the one of the second specified virtual machine or server handle communication traffic from multiple cell sites with different traffic load profiles; and
at least one of i) the one of the first specified virtual machine or server, and ii) the one of the second specified virtual machine or server handles communication traffic from at least one cell site to provide services pursuant to specified service level agreement (SLA) stipulating at least one of low latency and high throughput.

8. The method according to claim 6, wherein the CRAN network is an Open RAN based network, and the analytics engine is incorporated as part of a non-real time radio intelligence controller.

9. The method according to claim 1, further comprising:
evaluating, by an analytics engine, the first type of traffic load profile at the first specified cell site and the second type of traffic load profile at the second specified cell site.

* * * * *